US006673743B2

(12) United States Patent
Lok

(10) Patent No.: US 6,673,743 B2
(45) Date of Patent: Jan. 6, 2004

(54) NICKEL CATALYSTS ON TRANSITION ALUMINA

(75) Inventor: Cornelis Martinus Lok, Guisborough (GB)

(73) Assignee: Johnson Matthey PLC, London (GB)

( * ) Notice: Subject to any disclaimer, the term of this patent is extended or adjusted under 35 U.S.C. 154(b) by 73 days.

(21) Appl. No.: 09/927,060

(22) Filed: Aug. 10, 2001

(65) Prior Publication Data

US 2002/0016519 A1 Feb. 7, 2002

Related U.S. Application Data

(63) Continuation of application No. PCT/GB00/00442, filed on Feb. 11, 2000.

(30) Foreign Application Priority Data

Feb. 12, 1999 (GB) ............................................... 9903083
Jul. 27, 1999 (GB) ............................................... 9917545

(51) Int. Cl.[7] .......................... B01J 23/755; B01J 21/04
(52) U.S. Cl. ....................... 502/337; 502/327; 502/335; 502/355; 502/415; 502/439
(58) Field of Search ................. 502/327, 335, 502/337, 355, 415, 439

(56) References Cited

U.S. PATENT DOCUMENTS

| 4,064,152 | A |   | 12/1977 | McArthur |  |
|---|---|---|---|---|---|
| 4,191,664 | A |   | 3/1980 | McArthur |  |
| 4,229,234 | A | * | 10/1980 | Krutenat et al. | 148/105 |
| 4,273,724 | A | * | 6/1981 | Kugler et al. | 518/715 |
| 4,382,879 | A | * | 5/1983 | Funabashi et al. | 252/457 |
| 4,834,865 | A | * | 5/1989 | Kukes et al. | 208/59 |
| 4,861,746 | A | * | 8/1989 | Oishi et al. | 502/314 |
| 5,110,781 | A | * | 5/1992 | Griffiths et al. | 502/335 |
| 5,192,734 | A | * | 3/1993 | Creighton et al. | 502/314 |
| 5,320,998 | A | * | 6/1994 | Horiuchi | 502/245 |
| 5,389,595 | A | * | 2/1995 | Simpson et al. | 502/315 |
| 5,403,806 | A | * | 4/1995 | Simpson | 502/211 |
| 5,536,694 | A | * | 7/1996 | Schuetz et al. | 502/301 |
| 5,686,375 | A | * | 11/1997 | Iyer et al. | 502/315 |
| 5,705,723 | A | * | 1/1998 | Kallenbach et al. | 585/270 |
| 5,902,561 | A | * | 5/1999 | Carrea et al. | 423/210 |
| 5,948,377 | A | * | 9/1999 | Sung | 423/213.5 |
| 6,165,932 | A | * | 12/2000 | Narula et al. | 502/303 |
| 6,197,721 | B1 | * | 3/2001 | Didillon et al. | 502/326 |
| 6,207,611 | B1 | * | 3/2001 | Sun et al. | 502/325 |
| 6,261,465 | B1 | * | 7/2001 | Hancock | 210/763 |
| 6,383,974 | B1 | * | 5/2002 | Ishida et al. | 502/305 |

FOREIGN PATENT DOCUMENTS

| EP | 0 092 878 A2 | 11/1983 |
|---|---|---|
| EP | 0 464 956 A1 | 1/1992 |
| EP | 0 569 077 A1 | 11/1993 |

* cited by examiner

*Primary Examiner*—Cam N. Nguyen
(74) *Attorney, Agent, or Firm*—Pillsbury Winthrop LLP

(57) ABSTRACT

A particulate catalyst suitable for the hydrogenation of fats or oils containing 5 to 75% by weight of nickel may be made by slurrying a transition alumina powder having a surface-weighted mean diameter D[3,2] in the range 1 $\mu$m to 20 $\mu$m with an aqueous solution of a nickel ammine complex, followed by heating to deposit an insoluble nickel compound and then reducing the latter. Catalysts containing up to about 55% by weight of nickel have a nickel surface area above 130 m$^2$/g of nickel. Catalysts having greater nickel contents made using alumina having an average pore diameter above 12 $\mu$m may have a lower nickel surface area but are surprisingly active and selective.

21 Claims, No Drawings

NICKEL CATALYSTS ON TRANSITION ALUMINA

CROSS-REFERENCE TO RELATED APPLICATIONS

This Application is a continuation of International Application PCT/GB00/00442, filed Feb. 11, 2000, which designated the U.S. and was published in the English language.

This invention relates to catalysts and in particular to catalysts suitable for use for hydrogenation, especially the hydrogenation of oils and fats.

Oils and fats are often either partially or fully hydrogenated in a batch slurry process by suspending a particulate nickel catalyst in the oil or fat and feeding hydrogen thereto while heating the mixture, typically to a temperature in the range 80 to 250° C., possibly under pressure, e.g. at a pressure of up to 30 bar abs. For partial hydrogenation, the pressure is usually under 10 bar abs., for example 2 to 4 bar abs. For oil or fat hydrogenation, the catalyst should have a high activity so that the desired degree of hydrogenation can be achieved in a short time and/or a small amount of nickel can be employed. The catalyst should also exhibit a good selectivity in the case of partial hydrogenation so that over-hydrogenation of the oils and fats is minimised. Furthermore it is desirable that the residual catalyst can be readily filtered from the hydrogenated oil or fat and that the catalyst show good refuse properties.

Catalysts often employed for this process are nickel on a support of e.g. alumina and are characterised by, inter alia, a high nickel surface area per gram of nickel. Typical catalysts having a high nickel content are described in EP 0 168 091, wherein the catalyst is made by precipitation of a nickel compound and then a soluble aluminium compound is added to the slurry of the precipitated nickel compound while the precipitate is maturing, i.e. ageing. After reduction of the resultant catalyst precursor, the reduced catalyst typically has a nickel surface area of the order of 90 to 150 $m^2$ per g of total nickel. The catalysts have a nickel/aluminium atomic ratio in the range 2 to 10. Reduced catalysts having a nickel/aluminium atomic ratio above 2, in which at least 70% by weight of the total nickel has been reduced to elemental nickel, have a total nickel content of more than about 66% by weight.

Nickel/alumina hydrogenation catalysts, having a total nickel content of 5 to 40% by weight, but also having a high nickel surface area, made by a different route are described in U.S. Pat. No. 4,490,480. In the process of this latter reference, a nickel ammine complex, particularly a nickel ammine carbonate, is heated in the presence a transition alumina: this results in the precipitation of a nickel compound, such as nickel hydroxide or basic nickel carbonate, intimately associated with the alumina. In this latter process, an alumina powder may be slurried with a solution of the nickel complex, or shaped units, such as spheres or cylindrical extrudates, typically having a minimum dimension above about 1.5 mm, formed from the alumina are impregnated with a solution of the nickel complex. While catalysts having a nickel surface area over 130 $m^2$ per g total nickel, and indeed in some cases above 200 $m^2$ per g total nickel, are described, such high surface area products are all made by the aforesaid impregnation route using shaped alumina units: the catalysts made by slurrying alumina powder with the nickel complex have nickel surface areas significantly below 130 $m^2$ per g total nickel. While catalysts made using the preformed, shaped alumina units are of utility in fixed bed hydrogenation processes, they are unsuitable for the aforesaid batch slurry hydrogenation process as their size renders them liable to settling out from the slurry, and also, when used for partial hydrogenation, they tend to give over hydrogenation of the fats and oils. The aforementioned U.S. Pat. No. 4,490,480 indicates that catalysts suitable for batch slurry hydrogenation may be made by grinding high nickel surface area catalysts made by the aforesaid impregnation route using shaped alumina units. However the production of such catalysts by such a technique involves additional processing steps of forming the alumina into the shaped units and the subsequent comminution step.

Catalysts made directly from an alumina powder of 60–70 $\mu$m size containing 18–28% by weight of nickel and having a nickel surface area of up to 123 $m^2$ per g of nickel are also described in the aforesaid U.S. Pat. No. 4,490,480. However we have found that such materials had a relatively poor activity for the hydrogenation of oils.

We have now found that nickel/alumina catalysts having a high activity and/or good selectivity may be made by the aforesaid process employing a slurry of the alumina powder if an alumina powder having a small particle size is employed. Surprisingly, despite the use of a small particle size alumina, the catalysts are readily filtered from the hydrogenated fat or oil.

It has been proposed in GB 926 235 to make hydrogenation catalysts by this route using kieselguhr as the support. However, we have found that catalysts made using small particle size kieselguhr, as opposed to transition alumina, do not exhibit high nickel surface areas.

Accordingly we provide a method of making a nickel/alumina catalyst containing 5 to 75% by weight of total nickel comprising slurrying a transition alumina powder having a surface-weighted mean diameter D[3,2] in the range 1 $\mu$m to 20 $\mu$m with an aqueous solution of a nickel ammine complex, heating the slurry to cause the nickel amine complex to decompose with the deposition of an insoluble nickel compound, filtering the solid residue from the aqueous medium, drying and, optionally after calcining the solid residue, reducing the solid residue.

By the term total nickel, we mean the amount of nickel whether present in elemental or combined form. Generally however at least 70% by weight of the total nickel in the reduced catalyst will be in the elemental state.

The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167–172, and is calculated from the particle size analysis which may conveniently be effected by laser diffraction for example using a Malvern Mastersizer.

The transition alumina may be of the gamma-alumina group, for example a eta-alumina or chi-alumina. These materials may be formed by calcination of aluminium hydroxides at 400–750° C. and generally have a BET surface area in the range 150–400 $m^2/g$. Alternatively, the transition alumina may be of the delta-alumina group which includes the high temperature forms such as delta- and theta-aluminas which may be formed by heating a gamma group alumina to a temperature above about 800° C. The delta-group aluminas generally have a BET surface area in the range 50–150 $m^2/g$. The transition aluminas contain less than 0.5 mol of water per mole of $Al_2O_3$, the actual amount of water depending on the temperature to which they have been heated. The alumina should be porous, preferably having a pore volume of at least 0.2 ml/g, particularly in the range 0.3 to 1 ml/g.

It is preferred that the small particle size alumina has a relatively large average pore diameter as the use of such aluminas appears to give catalysts of particularly good selectivity. Preferred aluminas have an average pore diameter of at least 12 nm, particularly in the range 15 to 30 nm. [By the term average pore diameter we mean 4 times the pore volume as measured from the desorption branch of the nitrogen physisorption isotherm at 0.98 relative pressure divided by the BET surface area]. During the production of the catalyst, nickel compounds are deposited in the pores of the alumina, and so the average pore diameter of the catalyst will be less than that of the alumina employed, and decreases as the proportion of nickel increases. It is preferred that the reduced catalysts have an average pore diameter of at least 10 nm, preferably above 15 nm and particularly in the range 15 to 25 nm.

On the other hand, irrespective of the nickel content of the catalyst, the particle size of the catalyst is essentially the same as the particle size of the transition alumina, and so the catalysts generally have a surface-weighted mean diameter D[3,2] in the range 1 to 20 μm, and is preferably less than 10 μm, particularly less than 8 μm.

The catalysts of the invention contain 5 to 75% by weight of total nickel, preferably below 70% by weight total nickel. Catalysts containing up to about 55%, preferably 5 to 45%, by weight total nickel, typically have a nickel surface area above 130, preferably above 150, more preferably above 180, and in particular above 200, $m^2$ per gram total nickel.

Accordingly the present invention also provides a particulate nickel/transition alumina catalyst containing 5 to 55% by weight of total nickel, having a nickel surface area of at least 130 $m^2$ per gram of total nickel, and a surface-weighted mean diameter D[3,2] in the range 1 μm to 20 μm.

The nickel surface area may be determined as described in "Physical and Chemical Aspects of Adsorbents and Catalysts", edited by B. G. Linsen, Academic Press, 1970 London and New York, page 494 and 495, and is a measure of the surface area of the reduced, i.e. elemental, nickel in the catalyst.

We have found that in general, the nickel surface area of catalysts made by the process of the invention tends to decrease as the nickel content increases. However we have also found that catalysts made using large pore size aluminas and containing relatively large amounts of nickel are surprisingly active and selective even though they may not have such a high nickel surface area. Thus useful catalysts containing at least 20% by weight total nickel having an average pore diameter above 10 nm and a nickel surface area above 110 $m^2/g$ total nickel may be made using large pore aluminas.

Accordingly the present invention also provides a particulate nickel/transition alumina catalyst containing 20 to 75% by weight of total nickel, having a nickel surface area of at least 110 $m^2$ per gram of total nickel, a surface-weighted mean diameter D[3,2] in the range 1 μm to 20 μm, and an average pore diameter of at least 10 nm, preferably above 12 nm, and particularly in the range 15 to 25 nm.

Catalysts containing at least 20% by weight total nickel having a nickel surface area as low as 80 $m^2/g$ total nickel appear to have good activity and selectivity provided that the average pore diameter is above 15 nm.

Accordingly the present invention also provides a particulate nickel/transition alumina catalyst containing 20 to 75% by weight of total nickel, having a nickel surface area of at least 80 $m^2$ per gram of total nickel, a surface-weighted mean diameter D[3,2] in the range 1 μm to 20 μm, and an average pore diameter of at least 15 nm.

The catalysts may be made by slurrying the transition alumina powder with the appropriate amount of an aqueous solution of a nickel ammine complex, e.g. the product of dissolving basic nickel carbonate in a solution of ammonium carbonate in aqueous ammonium hydroxide, to give a product of the desired nickel content. The solution of the nickel ammine complex preferably has a pH in the range 9 to 10.5. The slurry is then heated, e.g. to a temperature in the range 60 to 100° C., to cause the nickel amine complex to decompose with the evolution of ammonia and carbon dioxide and to deposit an insoluble nickel compound, e.g. basic nickel carbonate on the surface, and in the pores, of the transition alumina. The alumina carrying the deposited nickel compound is then filtered from the aqueous medium and dried. It may then be calcined in air, e.g. at a temperature in the range 250 to 450° C., to decompose the deposited nickel compound to nickel oxide. Upon reduction of the nickel oxide, the high nickel surface area is generated. Alternatively the deposited nickel compound may be directly reduced, i.e. without the need for a calcination step. The reduction, whether or not a preliminary calcination step is employed, may be effected by heating to a temperature in the range 250 to 450° C. in the presence of hydrogen.

As indicated above, the catalysts are of particular utility for the hydrogenation of fats and oils, such as fish oil, soybean oil, rapeseed oil, and sunflower oil. Alternatively the catalysts may be used for other hydrogenation reactions such as the hydrogenation of olefinic compounds, e.g. waxes, nitro or nitrile compounds, e.g. the conversion of nitrobenzene to aniline or the conversion of nitrites to amines. They may also be used for the hydrogenation of paraffin waxes to remove traces of unsaturation therein.

As indicated above, in such a hydrogenation process, the requisite amount of catalyst is suspended in a charge of the oil or fat and the mixture heated, possibly under pressure, while hydrogen is introduced, e.g. sparged through the mixture. Conveniently the catalyst is charged to the hydrogenation vessel as a concentrate of the catalyst particles dispersed in a suitable carrier medium, e.g. hardened soybean oil. Preferably the amount of catalyst in said concentrate is such that the concentrate has a total nickel content of 5 to 30%, preferably 10 to 25% by weight.

Alternatively, in some cases the reduction may be effected in situ. Thus a precursor comprising the transition alumina and the unreduced nickel compound, e.g. oxide, possibly as a concentrate, i.e. dispersed in a carrier as aforesaid, may be charged to the hydrogenation reactor with the material to be hydrogenated and the mixture heated while hydrogen is sparged through the mixture.

Accordingly we also provide a catalyst precursor comprising a transition alumina and a reducible nickel compound, which when reduced with hydrogen at a temperature in the range 250 to 450° C. gives a particulate catalyst containing 5 to 55% by weight of total nickel, having a nickel surface area of at least 130 $m^2$ per gram of total nickel, and a surface-weighted mean diameter D[3,2] of 1 μm to 20 μm, preferably less than 10 μm.

We also provide a catalyst precursor comprising a transition alumina and a reducible nickel compound, which when reduced with hydrogen at a temperature in the range 250 to 450° C. gives a particulate catalyst containing 20 to 75% by weight of total nickel, having a nickel surface area of at least 80 $m^2$ per gram of total nickel, and a surface-weighted mean diameter D[3,2] of 1 μm to 20 μm, preferably less than 10 μm, and an average pore diameter above 10 nm.

The invention is illustrated by the following examples in which, unless otherwise specified, all percentages and parts per million (ppm) are by weight. The nickel surface areas are determined as described in the aforesaid "Physical and Chemical Aspects of Adsorbents and Catalysts", edited by B. G. Linsen, Academic Press, 1970 London and New York, at pages 494–495 using a reduction time of 1 hour.

EXAMPLE 1

The alumina employed was a transition-alumina of the theta alumina type having a surface area of about 108 $m^2/g$ and a pore volume of about 0.42 ml/g and having a surface-weighted mean diameter D[3,2] of 3.87 μm. The average pore diameter was thus about 16 nm.

A stock solution containing the nickel ammine complex was obtained by dissolving, per liter of stock solution, 52.1 g of basic nickel carbonate (48% Ni, 20% $CO_3$), 37.4 g of ammonium carbonate (32.5% $NH_3$, 55% $CO_3$) and 133 g of 30% $NH_3$ in water.

The alumina particles and sufficient of the stock solution to give about 33 g of nickel per 100 g of alumina were charged to a stirred vessel equipped with a condenser. The pH of the aqueous solution was 10.2. The mixture was heated to boiling while stirring and gentle boiling at about 96° C. was maintained until the solution became clear after about 90 min. The solid was then filtered off, washed and then dried air at 120° C. overnight. The resultant catalyst precursor, which had a nickel content of 19.6%, was then reduced by passing hydrogen through a bed of the catalyst while heating to 430° C.

The reduced catalyst (designated catalyst A) had a total nickel content of 24.7% and a nickel surface area of about 187 $m^2$ per g of total nickel (about 46 $m^2$ per g of catalyst). The average pore diameter of the catalyst was about 9.5 nm and the BET surface area was 135 $m^2/g$.

The surface-weighted mean diameter of the reduced catalyst particles was similar to that of the transition alumina employed.

EXAMPLE 2 (COMPARATIVE)

A catalyst, designated catalyst B, was made in accordance with the procedure of EP 0 168 091, using as the alkaline precipitation agent a solution containing 66.6 g of sodium carbonate and 25.4 g of sodium hydroxide per liter and a solution containing 35 g of nickel per liter. These two solutions were continuously fed into the precipitation vessel. Ambient temperature (22° C.), a mean residence time of 30 seconds, and a stirring energy of 25 $kW/m^3$ were used for this precipitation. The solution exiting this precipitation vessel was continuously fed into a stabilisation reactor which was held at 70° C. A sodium aluminate solution containing 10 g of Al per liter was also fed continuously into the stabilisation reactor while stirring moderately with an energy input of 2 $kW/m^3$. The slurry exiting the second reactor was collected in a third vessel and maintained at 60° C. for five hours. The slurry was then filtered, and washed with water at 70° C. The washed precipitate was reslurried into water at 70° C., and subsequently spray-dried. Elemental analysis of the spray dried product gave the following composition 45.6% of nickel, 4.0% of aluminium, 0.02% of sodium. The spray dried product was reduced at 430° C. in a hydrogen flow for 30 minutes and then used as catalyst B. The nickel surface area was 115 $m^2$ per g of total nickel.

The above preparation was repeated to give a similar catalyst, designated Catalyst C.

The hydrogenation performance of the catalysts was determined by using two different oils as follows:

In the first test a soybean oil of IV 133.5 and containing 1.8 ppm P, 1600 ppm of free fatty acids, 100 ppm water and 0 ppm soap and S, is used. 200 g of the oil and the required amount of reduced catalyst is charged to a closed, stirred, hydrogenation reactor. The mixture is heated to 160° C. and hydrogen sparged through the slurry at a pressure of 2 bar abs. The hydrogenation is done isothermally. The amount of hydrogen absorbed into the oil is monitored and the test is terminated once the amount of hydrogen required to drop the IV to 70 has been used. The hydrogenation time to reach an IV of 70 is used as a measure of the activity of the catalyst.

In the second test a sunflower oil of IV 132 and containing 0.4 ppm P, 800 ppm of free fatty acids, 600 ppm water, 4 ppm soap and 0.5 ppm S, is used. The hydrogenation is effected as described above but at 120° C. and at a pressure of 4 bar abs, and the time to reach an IV of 80 is determined.

The results are shown in the following table.

| Example | Catalyst | Catalyst weight (ppm nickel) | Hydrogenation time (min) soybean oil | Hydrogenation time (min) sunflower oil |
|---|---|---|---|---|
| 1a | A | 46 | 106 | — |
| 1b | A | 87 | 39 | — |
| 1c | A | 101 | — | 28 |
| 1d | A | 108 | 33 | — |
| 2a | B | 100 | 88 | — |
| 2b | B | 1000 | 18 | — |
| 2c | C | 100 | — | 66 |
| 2d | C | 1000 | — | 12 |

It is seen that the catalyst A in accordance with the invention was significantly more active than the comparative catalysts B and C as the hydrogenation time was decreased and/or less nickel could be employed.

The selectivity of the catalysts was assessed by determining the slip melting point, the solid fat content at 10° C., 20° C., 30° C. and 35° C., and the trans-isomer content of the hydrogenated oils.

The filterability was measured by using a standard filtration test. In this test, 170 ml of the hydrogenated oil to which 0.045 g of a filter aid (Harborlite 700) has been added, is heated at 110° C. and maintained at a pressure of 3 bar abs. in a vessel having an outlet of 0.5 $cm^2$ area at its bottom. This outlet contains an iron wire support on to which a cotton cloth, pre-coated with 0.02 g of the filter aid, has been fixed such that all the oil has to percolate through the cotton cloth. The time taken for 120 g of oil to filter is used as a measure of the filterability. The selectivity and filterability is set out in the following table.

| Catalyst | Slip mp (° C.) | Solids content (%) at 10° C. | 20° C. | 30° C. | 35° C. | Trans isomer (%) | Filtration time (min) |
|---|---|---|---|---|---|---|---|
| | | | Soybean oil | | | | |
| Ex 1a A (46 ppm) | 38.2 | 64.7 | 41.5 | 15.2 | 5.8 | 39.8 | 23 |
| Ex 1d A (108 ppm) | 38.0 | — | — | — | — | 39.9 | 23 |
| Ex 2a B (100 ppm) | 35.8 | 60.5 | 35.8 | 11.0 | 3.5 | 37.3 | 21 |

-continued

| Catalyst | Slip mp (° C.) | Solids content (%) at | | | | Trans isomer (%) | Filtration time (min) |
|---|---|---|---|---|---|---|---|
| | | 10° C. | 20° C. | 30° C. | 35° C. | | |
| | | | | Sunflower oil | | | |
| Ex 1c A (101 ppm) | 27.7 | — | — | — | — | — | — |
| Ex 2b C (100 ppm) | 28.7 | — | — | — | — | — | — |

EXAMPLE 3

The procedure of Example 1 was repeated but using such an amount of the nickel ammine complex solution that there was about 50 g nickel per 100 g alumina. The reduced catalyst had a total nickel content of 33.7% and a nickel surface area of 161 m² per g of total nickel.

EXAMPLE 4

The procedure of Example 1 was repeated but using different amounts of the nickel ammine carbonate solution relative to the amount of alumina to obtain a range of catalyst precursors, and hence reduced catalysts, (Catalysts D, E, and F), of different nickel contents.

EXAMPLE 5

The procedure of Example 4 was repeated using an alumina of larger pore diameter. The alumina employed was a transition-alumina of the gamma alumina type having a surface area of about 145 m²/g and a pore volume of about 0.85 ml/g and having a surface-weighted mean diameter D[3,2] of 2.08 μm. The average pore diameter was about 23 nm. As in Example 4, a range of catalysts (Catalysts G, H, I, J and K) of different nickel contents were produced.

The physical properties of the catalysts of Examples 4 and 5 are set out in the following table.

| | Catalyst | D | E | F | G | H | I | J | K |
|---|---|---|---|---|---|---|---|---|---|
| Precursor | Ni content (wt %) | 18.1 | 26.6 | 41.6 | 20.9 | 27.4 | 35.1 | 37.7 | 42.1 |
| Reduced catalyst | Ni content (wt%) | 21.8 | 34.3 | 65.3 | 26.0 | 35.5 | 49.4 | 58.5 | 67.3 |
| | Ni SA (m²/g catalyst) | 38.5 | 50.7 | 26.5 | 50.5 | 62.9 | 72.3 | 67.4 | 59.3 |
| | Ni SA (m²/g total Ni) | 177 | 148 | 41 | 194 | 177 | 146 | 115 | 88 |
| | Pore diameter (nm) | 10.6 | 9.4 | 8.2 | 18 | 19 | 19 | — | 16 |

Comparison of catalysts F and K demonstrates that whereas with the small pore size alumina support, the incorporation of a large amount of nickel results in a low nickel surface area, the use of a large pore size alumina enables catalysts having a relatively high nickel surface area to be obtained. The catalysts (with the exception of catalysts F and K) were tested as in Examples 1–2 and the results are shown in the following tables.

| Catalyst | Catalyst weight (ppm nickel) | Hydrogenation time (min) | |
|---|---|---|---|
| | | soybean oil | sunflower oil |
| D | 100.1 | 48 | — |
| | 104.6 | — | 36 |
| E | 100.4 | 52 | — |
| | 100.9 | — | 45 |
| G | 77.5 | 83 | — |
| | 76.8 | — | 93 |
| H | 101.1 | 61 | — |
| | 100 | — | 41 |
| I | 105 | — | 63 |
| J | 102.5 | 52 | — |

| Catalyst | Slip mp (° C.) | Solids content (%) at | | | | Trans isomer (%) | Filtration time (min) |
|---|---|---|---|---|---|---|---|
| | | 10° C. | 20° C. | 30° C. | 35° C. | | |
| | | | | Soybean oil | | | |
| D | 37.0 | 65.0 | 40.9 | 14.8 | 6.1 | 39.5 | 30 |
| E | 37.9 | 63.8 | 40.5 | 16.2 | 6.6 | 38.7 | 15 |
| G | 36.5 | 68.9 | 42.5 | 14.5 | 5.1 | 41.2 | — |
| H | 36.9 | 68.3 | 43.7 | 15.5 | 5.7 | 40.5 | — |
| J | 36.2 | 61.9 | 39.0 | 11.6 | 4.0 | 38.3 | 20 |

| Catalyst | Slip mp (° C.) | Solids content (%) at | | | | Trans isomer (%) | Filtration time (min) |
|---|---|---|---|---|---|---|---|
| | | 10° C. | 20° C. | 30° C. | 35° C. | | |
| | | | | Sunflower oil | | | |
| D | 27.4 | 27.9 | 9.4 | 1.5 | 0.4 | — | — |
| E | 30.2 | 31.3 | 12.8 | 2.8 | 0.1 | — | — |
| G | 26.7 | 27.6 | 8.1 | 0.5 | 0.0 | — | — |
| H | 26.7 | 27.1 | 8.0 | 0.5 | 0.6 | — | — |
| I | 28.0 | 28.9 | 9.6 | 1.4 | 0.0 | — | — |

EXAMPLE 6

Samples of the precursors used to make catalysts J and K were reduced at 360° C. instead of 430° C. as in the previous examples to produce catalysts L and M respectively, and were then tested as above. The nickel surface area was determined for catalyst L and was found to be 114 m²/g total nickel, i.e. similar to that (115 m²/g total nickel) for the corresponding catalyst, catalyst J, reduced at 430° C. The results are shown in the following tables.

| Catalyst | Catalyst weight (ppm nickel) | Hydrogenation time (min) | |
|---|---|---|---|
| | | soybean oil | sunflower oil |
| L | 89.7 | 54 | — |
| | 89.3 | — | 48 |
| M | 98.1 | 56 | — |
| | 99.4 | — | 50 |

| Catalyst | Slip mp (° C.) | Solids content (%) at | | | | Trans isomer (%) | Filtration time (min) |
|---|---|---|---|---|---|---|---|
| | | 10° C. | 20° C. | 30° C. | 35° C. | | |
| Soybean oil | | | | | | | |
| L | 36.0 | 62.1 | 38.0 | 12.2 | 4.4 | 38.8 | 12 |
| M | 36.7 | 63.7 | 39.9 | 13.4 | 4.6 | 37.8 | 24 |
| Sunflower oil | | | | | | | |
| L | 27.4 | 26.4 | 8.0 | 0.8 | 0.8 | — | — |
| M | 28.1 | 28.1 | 9.2 | 1.4 | 0.5 | — | — |

This shows that with these catalysts having a relatively high nickel content satisfactory catalysts can be obtained using a lower reduction temperature. In particular it is noted that whereas the high nickel content (67.3%) catalyst K had a relatively low nickel surface area (88 m²/g total nickel) when reduced at 430° C., the performance of the corresponding catalyst, catalyst M, reduced at the lower temperature, 360° C., was similar to, or better than, that of catalyst H which had a much lower nickel content (35.5%) but a much greater nickel surface area (177 m²/g total nickel).

EXAMPLE 7

Catalysts N & O were prepared following the procedure described in Example 1 using a different alumina substrate: ALCOA HiQ7412F, grades Q1037 and Q1058 respectively. Grade Q1037 had a surface-weighted mean diameter D[3,2] of 4.4 μm, a pore volume of 0.44 ml/g and a BET surface area of 137 m²/g, giving an average pore diameter of about 13 nm. Grade Q1058 had a particle size (d 3,2) of 1.5 μm, a pore volume of 0.34 ml/g and a BET surface area of 117 m²/g, giving an average pore diameter of about 12 nm. The catalysts were prepared using a ratio of alumina: nickel of 2.25 by weight.

The hydrogenation performance of the catalysts was tested using soybean oil as described in Example 2 and the results are shown in Table 8 below.

TABLE 8

| Catalyst | Ni % (w/w) | Ni SA (m²/g Ni) | Ni input (ppm) | Hydrog. time (min) | Slip mp (° C.) | Solids content (%) at | | | | Trans isomer (%) | Filtration time (min) |
|---|---|---|---|---|---|---|---|---|---|---|---|
| | | | | | | 10° C. | 20° C. | 30° C. | 35° C. | | |
| N | 23.7 | 189 | 113 | 39 | 40.5 | 63.4 | 41.5 | 17.2 | 8.1 | 38.2 | 11 |
| | 25.3 | 166 | 102 | 52 | 43.8 | 64.3 | 43.3 | 21.2 | 12.1 | 37.3 | 9 |
| O | 25.0 | 153 | 99 | 42 | 36.4 | 65.8 | 39.4 | 12.7 | 4.1 | 38.4 | 34 |
| | 25.6 | 135 | 99 | 48 | 37.1 | 65.2 | 41.9 | 14.2 | 4.9 | 38.6 | 20 |

What is claimed is:

1. A particulate nickel/transition alumina catalyst containing 5 to 75% by weight of total nickel, having a nickel surface area of at least 80 m² per gram of total nickel, and a surface-weighted mean diameter D[3,2] in the range 1 μm to 20 μm.

2. A particulate nickel/transition alumina catalyst according to claim 1 having a nickel surface area of at least 110 m² per gram of total nickel.

3. A particulate nickel/transition alumina catalyst according to claim 1 containing 5 to 55% by weight of total nickel, having a nickel surface area of at least 130 m² per gram of total nickel, and a surface-weighted mean diameter D[3,2] in the range 1 μm to 20 μm.

4. A particulate nickel/transition alumina catalyst according to claim 3 having a total nickel content in the range 20 to 35% by weight.

5. A particulate nickel/transition alumina catalyst according to claim 3 having an average pore diameter above 10 nm.

6. A particulate nickel/transition alumina catalyst according to claim 1, containing 20 to 75% by weight of total nickel, having a nickel surface area of at least 80 m² per gram of total nickel, a surface-weighted mean diameter D[3,2] in the range 1 μm to 20 μm, and an average pore diameter above 15 nm.

7. A particulate nickel/transition alumina catalyst according to claim 6 having a nickel surface area above 110 m² per gram of total nickel.

8. A particulate nickel/transition alumina catalyst according to claim 1, containing 20 to 75% by weight of total nickel, having a nickel surface area of at least 110 m² per gram of total nickel, and the particles having a surface-weighted mean diameter D[3,2] in the range 1 μm to 20 μm and an average pore diameter above 10 nm.

9. A particulate nickel/transition alumina catalyst according to claim 1 having a total nickel content below 70% by weight.

10. A particulate nickel/transition alumina catalyst according to claim 1 having a surface-weighted mean diameter D[3,2] below 10 μm.

11. A catalyst precursor comprising a transition alumina and a reducible nickel compound, which when reduced with hydrogen at a temperature in the range 250 to 450° C. gives a particulate catalyst according to claim 1.

12. A concentrate containing 10 to 25% by weight of nickel comprising a catalyst precursor according to claim 11, dispersed in a carrier.

13. A particulate nickel/transition alumina catalyst according to claim 1, further comprising a carrier, wherein the particulate catalyst is dispersed in the carrier in amount to provide from 10 to 25% by weight of nickel in the resulting dispersion.

14. A concentrate containing 10 to 25% by weight of nickel comprising a particulate catalyst according to claim 1, dispersed in a carrier.

15. A method of making a nickel/transition alumina catalyst containing 5 to 75% by weight of total nickel, comprising slurrying a transition alumina powder having a surface-weighted mean diameter D[3,2] in the range of 1 $\mu$m to 20 $\mu$m with an aqueous solution of a nickel ammine complex, heating the slurry to cause the nickel ammine complex to decompose with the deposition of an insoluble nickel compound, filtering the solid residue from the aqueous medium, drying and, optionally after calcining the solid residue, reducing the solid residue.

16. A method of making a nickel/alumina catalyst according to claim 15, further comprising, dispersing the reduced solid residue in a carrier.

17. A method of making a nickel/alumina catalyst according to claim 16, wherein the amount of said carrier and said solid residue provide 10 to 25% by weight of nickel in the dispersed solid residue and carrier product.

18. A method according to claim 15, wherein the alumina powder has an average pore diameter of at least 12 nm.

19. A method according to claim 15, wherein the transition alumina is a delta alumina.

20. A nickel/transition alumina catalyst containing 5 to 75% by weight of total nickel, having a nickel surface area of at least 80 m$^2$ per gram of total nickel, and a mean diameter D[3,2] in the range of 1 $\mu$m to 20 $\mu$m, obtained by the method of claim 15.

21. A concentrate containing 10 to 25% by weight of nickel comprising a catalyst made by the method according to claim 15, dispersed in a carrier.

* * * * *